H. REYELS & F. EBERT.
MACHINE FOR CUTTING AND CLEANING ENTRAILS.
No. 11,463. Reissued Jan. 8, 1895.
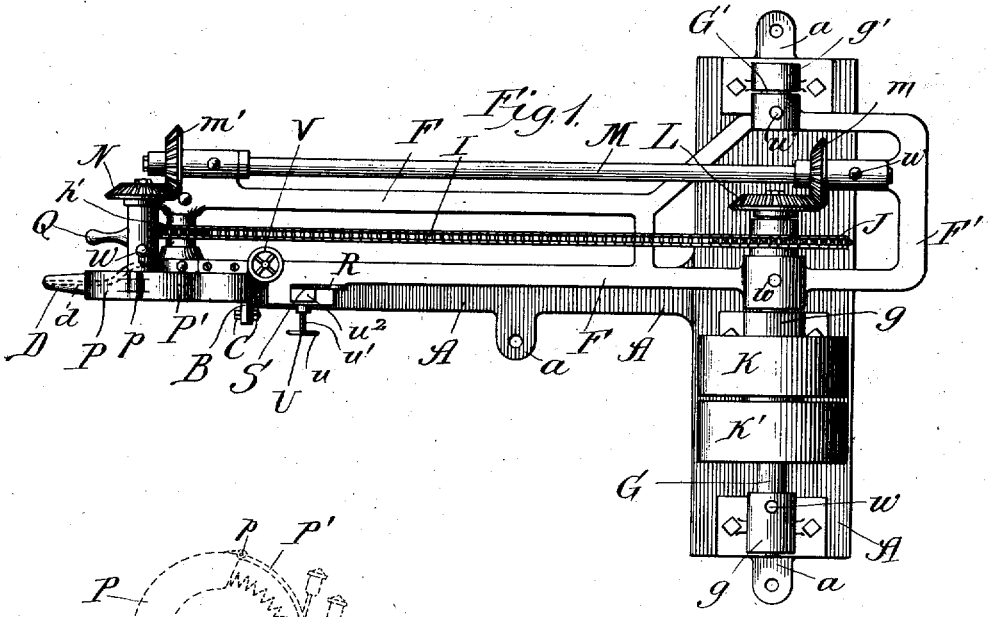
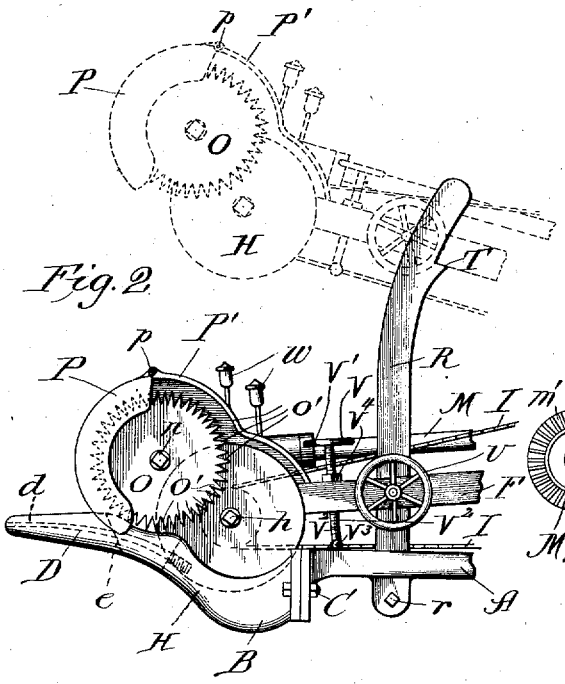
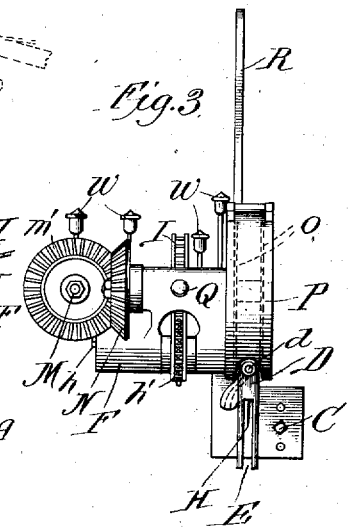
Witnesses:
Chas. E. Gaylord,
Lute F. Alter
Inventors:
Henry Reyels,
Frederick Ebert.
By Dyrenforth & Dyrenforth
Attys.

UNITED STATES PATENT OFFICE

HENRY REYELS AND FREDERICK EBERT, OF CHICAGO, ILLINOIS.

MACHINE FOR CUTTING AND CLEANING ENTRAILS.

SPECIFICATION forming part of Reissued Letters Patent No. 11,463, dated January 8, 1895.

Original No. 519,685, dated May 8, 1894. Application for reissue filed October 31, 1894. Serial No. 527,540.

*To all whom it may concern:*

Be it known that we, HENRY REYELS and FREDERICK EBERT, both residents of the city of Chicago, in the county of Cook and State of Illinois, have jointly invented certain new and useful Improvements in Machines for Cutting and Cleaning Entrails, of which this specification, when taken in connection with the drawings accompanying and forming a part hereof, is a full and complete description, sufficient to enable those skilled in the art to which the invention pertains to make and use the same.

We are aware of the machine constructed by Louis M. Hoffmann and described and claimed in the Letters Patent of the United States granted him therefor and numbered 461,804; and the object of our invention is to obtain a machine of the class to which it relates which will obviate certain of the difficulties which have been found to attend the practical working of the Hoffmann machine.

To obtain the object sought by us our invention has been embodied in the construction illustrated in the drawings and hereinafter described and claimed.

In the drawings referred to as illustrating the machine embodying our invention, Figure 1 is a top plan view thereof; Fig. 2, a side elevation of one end thereof, with a portion, indicated by dotted lines, in an elevated position; and Fig. 3 an end elevation viewed from the front.

The several parts of the machine are designated by a given letter of reference where more than one view thereof appears in the different figures of the drawings.

A is the base of the machine, and *a*, *a* are lugs or ears having holes adapted to have bolts extended through them for fastening the machine to a suitable foundation, as, say, planking, placed over a tub or tank containing water.

B is a forward extension of base A, secured thereto by bolts C and terminating in the finger D.

*d* is a passage way extending longitudinally from the forward end of the finger D backward a short distance and to one side of the finger and adapted at its rear end to have coupled to it, in the ordinary way, a water hose or pipe.

E (Fig. 3) is a slot extending from the back of part B forward into the finger D thereof, and terminating at, say, the dotted line *e* (Fig. 2).

F is a frame pivotally secured to the base A on shafts G, G′.

H is a rotary cutter in frame F.

*h* is the rotatable shaft to which cutter H is rigidly secured.

*h′* is a sprocket wheel, also rigidly secured to shaft *h*, and I is a chain extending over the sprocket wheel *h′* to and over the sprocket wheel J rigidly secured upon the shaft G. The shaft G is actuated by a belt extending over a tight pulley K.

K′ is a loose pulley.

L is a beveled gear-wheel rigidly secured to the shaft G, and M is a rotatable shaft having secured thereto at one end gear *m*, intermeshing with gear L, and at the other end gear *m′* intermeshing with gear N rigidly secured upon the shaft *n*. The frame F is counterbalanced by the weighted end F′ thereof.

The feed wheels O O are, respectively, constructed of sheet steel and have on their peripheries teeth O′, O′ O′.

The parts P P′, connected together by the hinge *p*, constitute a cover adapted to protect the hands of a person operating the machine. The part P may be raised to permit the sharpening of the feed-wheels O O, or the cutting wheel H.

Q is a handle on the frame F by means of which it is elevated.

R is a rest extending from the pivot *r*, by which it is secured to the base A, upward through the slot S in the frame F.

T is a step or projection on the rest R, adapted to come into contact with the under side of the frame A when the latter is raised into the position indicated by the dotted lines in Fig. 2, and thereby maintain such frame in its raised position.

U is a safety-clamp by means of which the frame A can be maintained in any desired position. The safety-clamp U consists of the hand wheel *u*, screw-threaded shaft *u′* and block $u^2$. To operate this clamp U the block $u^2$ is forced, by the rotation of hand-wheel $u$ and screw-threaded shaft $u'$, against the rest R.

V is an adjusting device by means of which the relative position of the finger D and the feed and cutting wheels O O H, respectively, are determined and controlled in adjusting the machine for operation. The adjusting device V is composed of the hand-wheel V′ and screw-threaded shaft or bolt $V^2$ extending through a correspondingly threaded hole in the frame F. The lower end (lettered $V^3$) of the screw-threaded shaft or bolt $V^2$ rests on the base A.

$V^4$ is a set-nut on the screw-threaded shaft or bolt $V^2$.

W, W, W, are respectively oil-cups.

The respective shafts G G′ hereinbefore referred to are rotatably mounted in journals $g, g, g'$ respectively.

In mounting the rotary cutter so that it is in the frame F and not in the part B of the device, the cutter comes into contact with the outer surface of the entrail extended over the finger D and hence any hard material contained in the entrails, together with other matter, will not come between the cutter and the entrails, as is the case when the cutter is mounted in the finger D; and further, if the cutter is rotated while in contact with the entrails extended over the finger D, the cutting open of the entrails is more surely effected and the operation of the machine is more certainly rendered continuous. By forcing water or other cleansing liquid through the passage-way $d$ in the finger D and delivering it therefrom against the material contained in the entrails we have found that they are so thoroughly cleaned that no other or additional cleansing device is required; and at the same time the contents of the entrails are so softened by the water or other cleansing liquid that they offer no substantial resistance to the drawing of the entrails over the finger by the feed wheels O O. Rupture of the entrails is thus obviated in the practical operation of the machine.

In the operation of the machine one end of the entrails to be cut and cleaned is drawn over the finger D and into contact with feed-wheels O O. The feed-wheels O, O, and rotary cutter H are actuated, and water or other liquid is forced through passage way $d$. The entrails are thus continuously cut and cleaned.

Having thus described our invention, what we claim, and desire to secure by Letters Patent, is—

1. In a machine for cutting and cleaning entrails, the combination of a tubular finger over which the entrails are drawn, a conduit leading to the interior of the finger operating to direct liquid under pressure through the finger into the entrails, feed mechanism operating to advance the entrails upon the finger, and a cutter operating to slit the entrails longitudinally as they are advanced, substantially as described.

2. In a machine for cutting and cleaning entrails, the combination of a finger over which entrails may be drawn, a slot in the finger in which the edge of a rotary cutter may extend, a passage-way for liquid extending through and adapted to deliver liquid from the end of the finger into the contents of the entrails passing onto the finger, with a frame pivotally attached to the base to which the finger is attached, rotatable feed wheels and a rotatable cutter mounted in the frame and adapted to be brought in contact with the entrails on the finger, and means for rotating the feed-wheels and cutter, substantially as described.

3. In a machine for cutting and cleaning entrails, the combination of a finger having a slot therein adapted to receive the edge of a rotary cutting wheel and a passage-way for liquid extending longitudinally therethrough and discharging at the forward end thereof, with a frame pivotally secured to the base to which the finger is attached, cutting and feed wheels rotatably mounted in the frame, a beveled gear-wheel secured on the shaft to which the feed wheels are secured, a shaft rotatably mounted and extending longitudinally in the pivotally mounted frame, a beveled gear wheel at one end of such shaft intermeshing with the beveled gear wheel on the shaft of the cutting wheel and a beveled gear wheel at the other end of the shaft intermeshing with a beveled gear wheel rigidly secured to one of the shafts on which the frame is pivotally mounted, and means for rotating the cutting wheel substantially as described.

4. In a machine for cutting and cleaning entrails, a base, a finger grooved in the back portion thereof secured to the base, such finger having a passage way for liquid extending from a nipple on the side to and discharging from the forward end thereof, and journal bearings on the base, in combination with a counterbalanced frame having journal bearings therein, shafts extending through the journal bearings in the base and frame and pivotally securing the frame to the base, rotatable cutting and feed wheels mounted in the frame, beveled gear wheels on one of the shafts connecting the frame and base together and on the shaft of the feed wheels, a shaft extending longitudinally in the frame and having beveled gear wheels thereon intermeshing with the beveled wheels on the frame and feed wheel shafts, respectively, an additional wheel secured to the shaft connecting the frame and base together whereon the beveled gear is placed, a wheel secured to the shaft of the rotatable cutting wheel, a connection extending over such wheels, and means for clamping the frame and base in a given relative position, and means for adjusting them; substantially as described.

5. In a machine for cutting and cleaning entrails, a base having a finger thereon over which entrails may be drawn, such finger having a passage-way for liquid extending from a nipple on the side to and discharging from the outer end thereof, and a frame pivotally secured to the base by shafts extending through journals on the base and frame, respectively, in combination with rotatable cutting and feed wheels mounted in the frame and connections extending from one of the shafts connecting the base and frame to the rotatable cutting and feed wheels, whereby rotation of such cutting and feed wheels will be produced by rotation of such shaft; substantially as described.

HENRY REYELS.
FREDERICK EBERT.

Witnesses:
J. H. LEE,
J. HANSON.